United States Patent
Rojo Lulic (10) Patent No.: US 8,704,418 B2
(45) Date of Patent: Apr. 22, 2014

(54) EXTERNAL ROTOR MOTOR

(75) Inventor: Francisco Rojo Lulic, St. Georgen (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 48 days.

(21) Appl. No.: 13/574,621

(22) PCT Filed: Feb. 25, 2011

(86) PCT No.: PCT/EP2011/000935
§ 371 (c)(1),
(2), (4) Date: Jul. 22, 2012

(87) PCT Pub. No.: WO2011/113522
PCT Pub. Date: Sep. 22, 2011

(65) Prior Publication Data
US 2012/0326542 A1    Dec. 27, 2012

(30) Foreign Application Priority Data
Mar. 15, 2010   (DE) .................... 20 2010 003 858 U (51) Int. Cl.
H02K 5/16   (2006.01)

(52) U.S. Cl.
USPC .......................... 310/90; 310/67 R (58) Field of Classification Search
USPC .......................... 310/67 R, 89–91
See application file for complete search history.

(56) References Cited

U.S. PATENT DOCUMENTS

| | | | |
|---|---|---|---|
| 4,603,983 A | | 8/1986 | Hofmann et al. ............. 384/512 |
| 4,612,468 A | * | 9/1986 | Sturm et al. ................. 310/67 R |
| 4,634,908 A | * | 1/1987 | Sturm ............................. 310/64 |
| 4,823,034 A | * | 4/1989 | Wrobel ........................ 310/67 R |
| 4,922,162 A | * | 5/1990 | Shiraki et al. ................. 310/268 |
| 5,013,957 A | * | 5/1991 | Wrobel ................... 310/216.049 |

(Continued)

FOREIGN PATENT DOCUMENTS

| | | |
|---|---|---|
| DE | 100 52 039 A | 5/2002 |
| WO | WO 2005-095802 A | 10/2005 |

OTHER PUBLICATIONS

US TM Reg. # 762,530 for Ultramid, issued to BASF AG, Ludwigshafen, Germany.

(Continued)

*Primary Examiner* — Thanh Lam
(74) *Attorney, Agent, or Firm* — Milton Oliver, Esq.; Oliver Intellectual Property LLC (57) ABSTRACT

An electronically commutated external-rotor motor has an internal stator (20), having a stator lamination stack (64) and a winding arrangement (66) associated therewith. the latter, as well as a central opening (149) of the stator lamination stack (64), in which opening a bearing tube (56) is arranged. The motor further has a permanent-magnet external rotor (26) separated from the stator lamination stack (64) by a magnetically effective air gap (99), which rotor has a shaft (42) that is journalled in the bearing tube (56). First and second rolling bearings (48, 50) are arranged at a distance from one another in the bearing tube (56). The first rolling bearing (48), adjacent the rotor hub, is a floating bearing, while the second rolling bearing (50), near the shaft end (70) remote from the hub (40), is braced with one side against a shoulder (82) provided in the bearing tube (56). A compression spring (78) urges the two bearings toward one another, so that they serve as both an axial bearing and a radial bearing for the motor, thereby providing improved durability and longer service life.

6 Claims, 14 Drawing Sheets

(56) References Cited

U.S. PATENT DOCUMENTS

| | | | |
|---|---|---|---|
| 5,925,948 A * | 7/1999 | Matsumoto | 310/67 R |
| 7,262,532 B2 | 8/2007 | Seidler et al. | 310/103 |
| 2007/0001523 A1* | 1/2007 | Ko et al. | 310/51 |
| 2007/0075597 A1 | 4/2007 | Seidler et al. | 310/67 |
| 2007/0241643 A1* | 10/2007 | Watanabe et al. | 310/67 R |
| 2008/0157634 A1* | 7/2008 | Sekiguchi et al. | 310/67 R |

OTHER PUBLICATIONS

US TM Reg. # 700,008 for Technyl, issued to Societe Rhodiaceta, Paris, France.

US TM Reg. #2,806,114 for Technyl, issued to Rhodia Eng. Plastics, St.Fons, France.

Wikipedia, "Bearing (mechanical)" retrieved Jul. 23, 2012 from www.Wikipedia.org, 10 pages.

* cited by examiner

EXTERNAL ROTOR MOTOR

CROSS-REFERENCE

This application is a section 371 of PCT/EP11/00935, filed 2011 Feb. 25, published 2011 Sep. 22 as WO 2011-1135220-A2, and further claims priority from German application DE 20 2010 003 858.8, filed 2010 Mar. 15, the entire content of which is incorporated by reference.

FIELD OF THE INVENTION

The invention relates to an external-rotor motor.

BACKGROUND

Such motors have an internal stator, and arranged around the latter is usually a cup-shaped external rotor which has a shaft that is journalled in a bearing tube in the interior of the internal stator. There are various ways of achieving this.

SUMMARY OF THE INVENTION

It is an object of the invention to make available a novel structure for an external-rotor motor with improved durability.

According to the invention, this object is achieved by arranging first and second rolling bearings, spaced from each other, on the rotor shaft in the bearing tube, the inner ring of the first rolling bearing being displaceable on the rotor shaft, under the influence of a spring force, tending to urge the inner ring away from a free end of the shaft, toward a rotor hub connected to the other end of the shaft. The result thereof is, that the rolling bearings for the shaft of the external rotor can be effective as both radial and axial bearings, yielding a long service life.

BRIEF FIGURE DESCRIPTION

Further details and advantageous refinements of the invention are evident from the exemplifying embodiments, in no way to be understood as a limitation of the invention, that are described below and depicted in the drawings.

DETAILED DESCRIPTION

Figure 1:
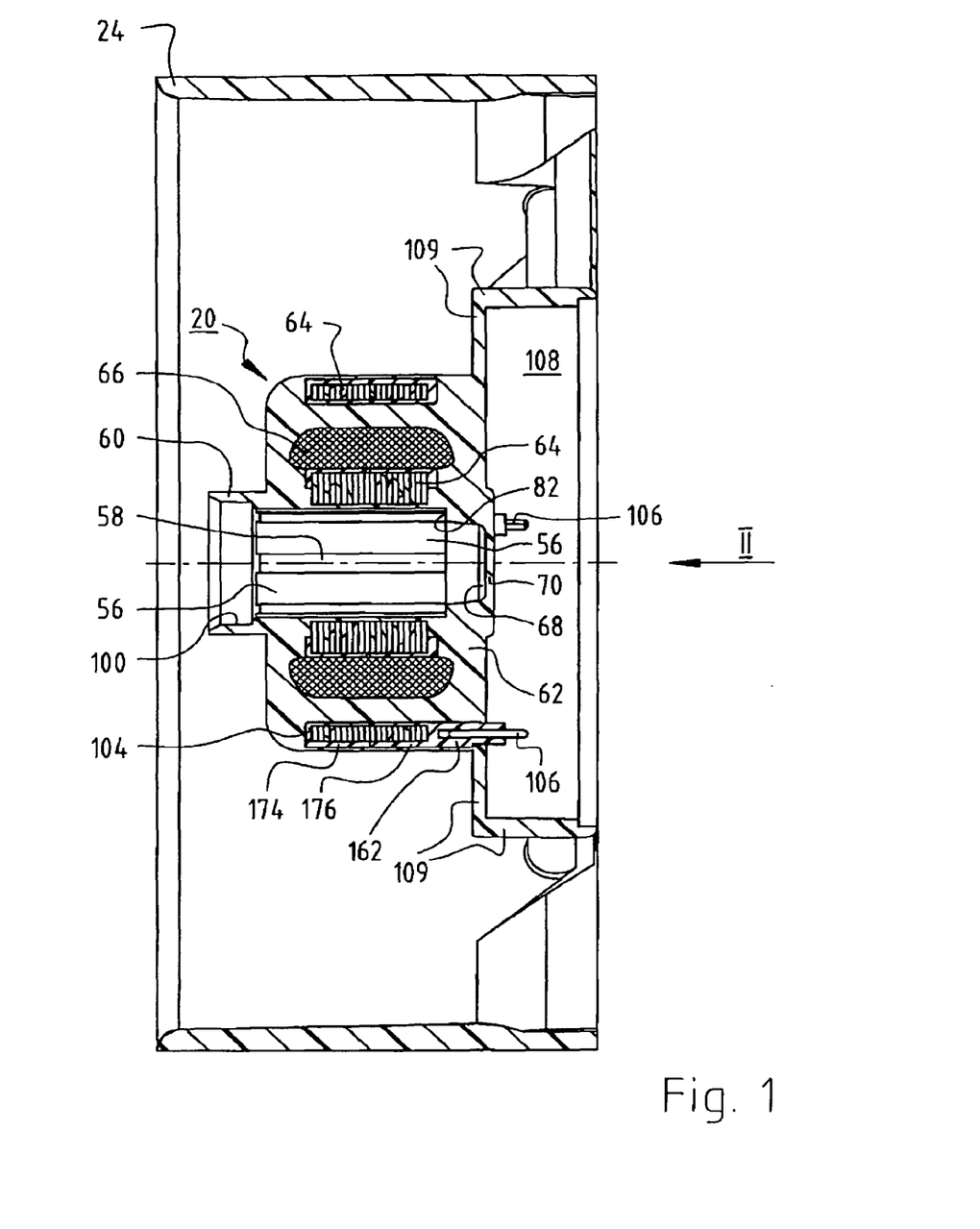
FIG. 1 is a longitudinal section through the basic framework of an external-rotor motor including its internal stator and its fan housing.
Figure 9:
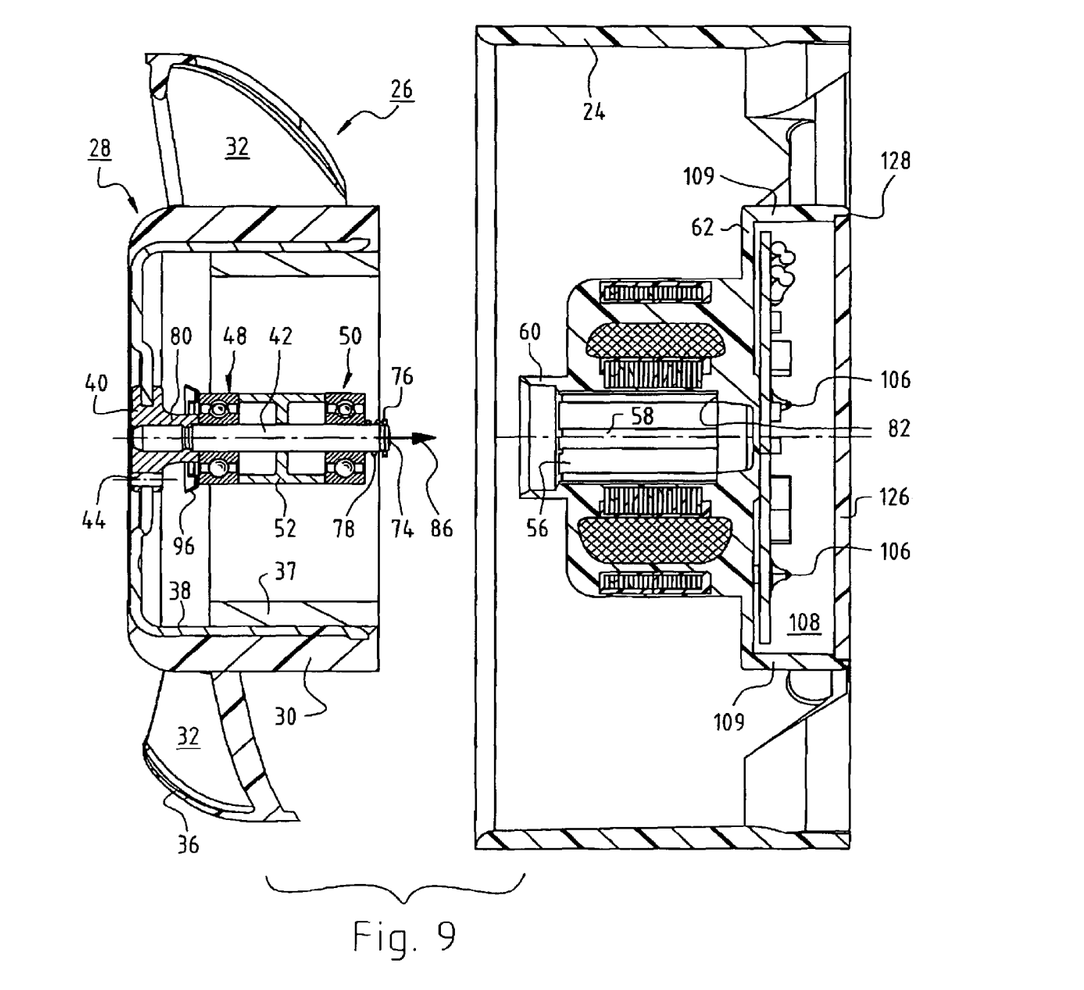
FIG. 9 is a depiction analogous to FIG. 7, in the context of assembly of the permanent-magnet rotor.
Figure 10:
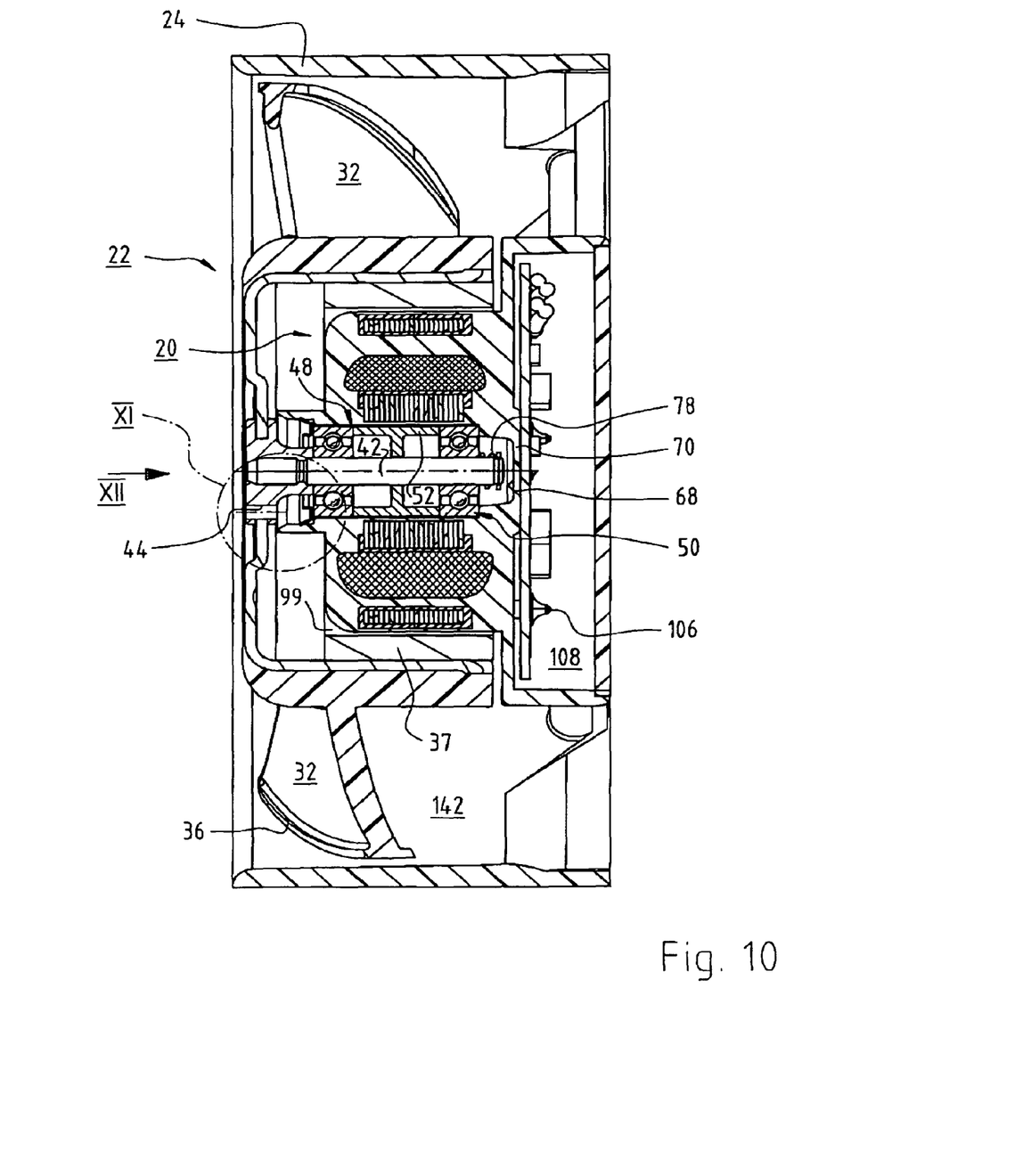
FIG. 10 is a sectioned depiction of the motor of FIG. 9 in the assembled state, viewed along line X-X of FIG. 12.
Figure 12:
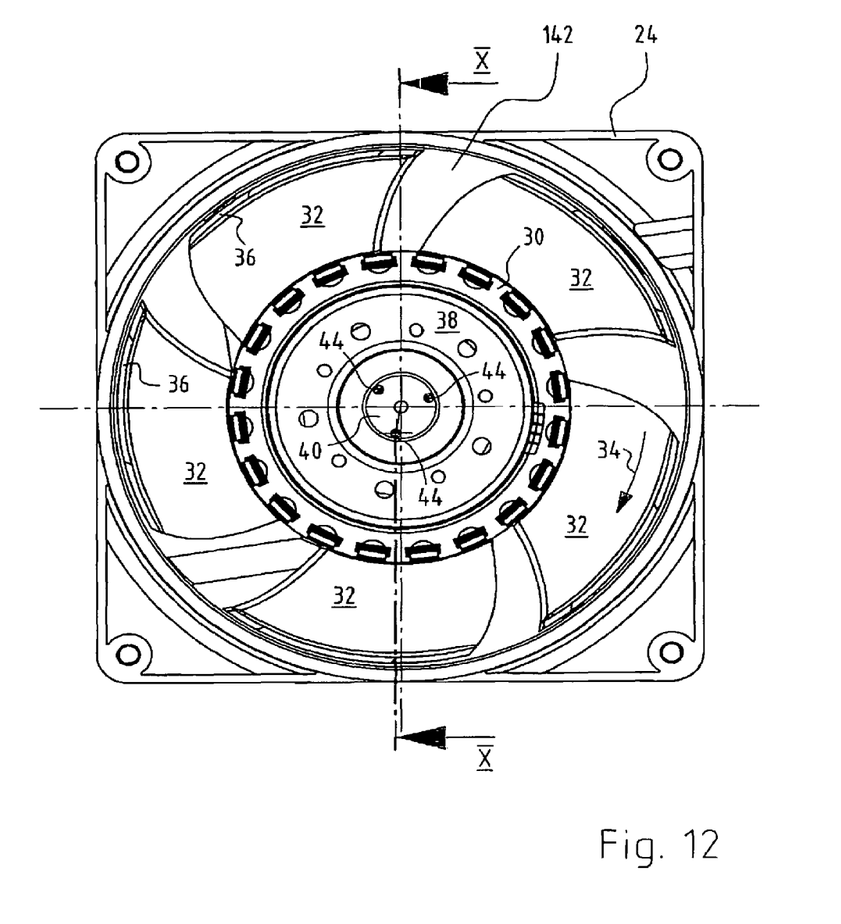
FIG. 12 is a plan view looking along arrow XII of FIG. 10.

FIG. 1 is a longitudinal section through internal stator 20 of an external-rotor motor 22 depicted in FIG. 10 and its fan housing 24, in which a fan wheel 26 (FIG. 9) rotates during operation. Said wheel is constituted by an external rotor 28 on whose outer circumference 30 fan blades 32 are implemented. The rotation direction of external rotor 28 is labeled 34 in FIG. 12.

Each fan blade 32 preferably has on its outer periphery an enlargement 36 in order to improve the efficiency of fan wheel 26.

As FIG. 9 shows, external rotor 28 has a cup-shaped magnetic yoke 38 made of soft iron, and the latter is connected at its center to a rotor hub 40, in which a shaft 42 is secured in the manner depicted. Hub 40 has openings 44 that are utilized during assembly of the fan, and whose function will be further explained below.

Shaft 42 has two rolling bearings to journal it, namely a first rolling bearing 48 on the side of shaft 42 facing toward rotor 28, and a second rolling bearing 50 on the side of shaft 42 facing away from rotor 28. Located between the respective outer rings of rolling bearings 48, 50 is an annular spacing member 52 (see FIG. 9), H-shaped in cross-section. This spacing member is guided on shaft 42.

A bearing tube 56, which is depicted in FIG. 1, serves to receive rolling bearings 48, 50 and spacing member 52. Said tube has, on its inner circumference, longitudinal ribs 58 whose radially inner ends define a circular enveloping curve. The respective outer rings, of each of the two bearings 48, 50, are guided in ribs 58.

Bearing tube 56 transitions to the left into a collar 60 (see FIG. 1). It transitions further into a partly insulating casing 62 of internal stator 20, whose stator lamination stack, packeted in the usual manner, is labeled 64, and whose winding arrangement is labeled 66.

Provided in this casing 62 as a continuation of bearing tube 56 is a dimple-like recess 68 whose bottom 70 closes off bearing tube 56 in a fluid-tight manner at this location.

As FIG. 10 shows, bottom 70 forms an axial tolerance region for free end 74 (FIG. 9) of shaft 42, i.e. free end 74 does not abut against bottom 70. A snap ring 76 is provided in the region of free end 74 in a groove of shaft 42, and provided between said snap ring 76 and the inner ring of second rolling bearing 50 is a compression spring 78 that urges the inner rings of rolling bearings 48, 50 toward one another, since a projection 80 (FIG. 11) of hub 40, which latter is fixedly connected to shaft 42, abuts against the inner ring of first rolling bearing 48, while spring 78 urges the inner ring of second rolling bearing 50 to the left in FIG. 9, so that the inner rings of rolling bearings 48, 50 are urged toward one another.

As FIGS. 9 and 10 show, the outer ring of second rolling bearing 50 abuts against a shoulder 82 (FIGS. 1 and 9) of bearing tube 56, and is secured in that position. The inner ring of first rolling bearing 48 is arranged slidably (floating bearing) on shaft 42, so that the latter is pressed toward the right in FIG. 10. The two rolling bearings 48, 50 can thereby serve as both a radial bearing and an axial bearing for external rotor 28.

Figure 11:
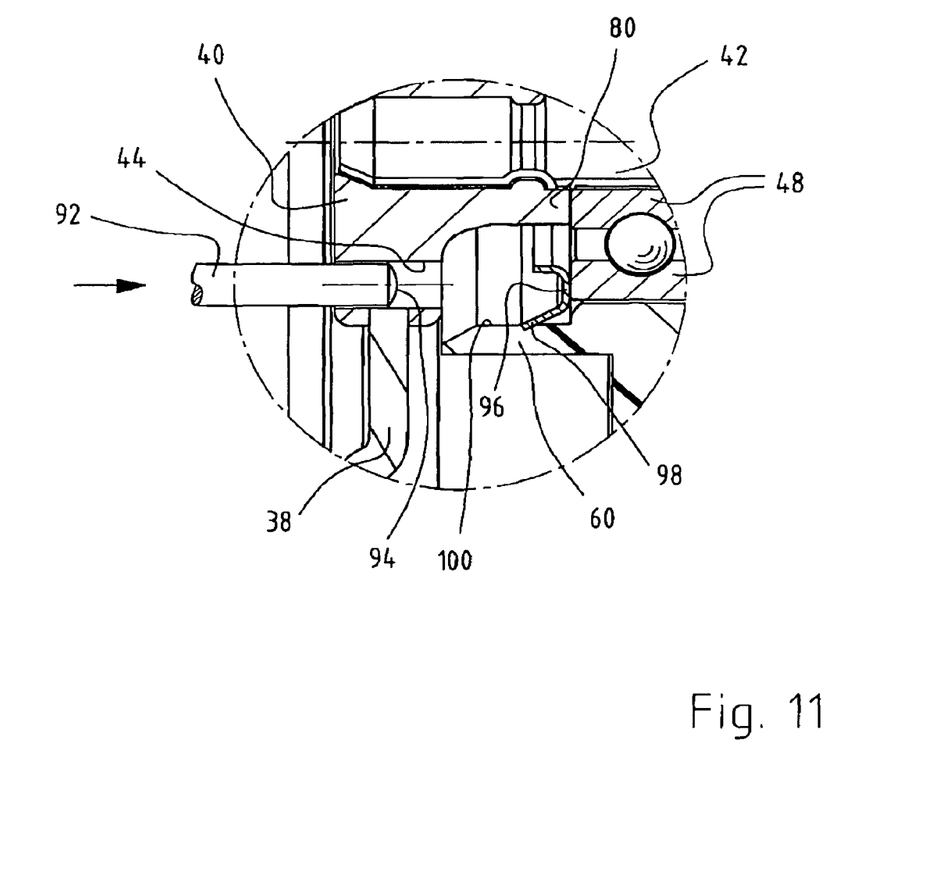
FIG. 11 is an enlargement of detail XI of FIG. 10, in which an installation tool is additionally indicated.

As FIG. 9 of the assembly process shows, the two rolling bearings 48, 50 are pressed in the direction of an arrow 86 into longitudinal ribs 58 of bearing tube 56. This occurs with the aid of pins 92 that are passed through openings 44 of hub 40. FIG. 11 shows only one of said pins 92, which abut during installation, with their right (in FIG. 11) ends 94, against a securing member 96 and press it against the outer ring of first rolling bearing 48, the outer ring of second rolling bearing 50 also being displaced by spacing member 52 (FIG. 9) to the right and being brought into abutment against shoulder 82 of bearing tube 56. In this manner, the outer rings of both rolling bearings 48, 50 are secured within bearing tube 56.

Securing member 96 is fastened in collar 60, in the position that is attained, by the fact that it cuts with its sharp frusto-conical edge 98 (FIG. 11) into inner surface 100 of collar 60 and therefore can no longer be displaced to the left in FIG. 11. The result is that secure and zero-clearance installation of rolling bearings 48, 50 into bearing tube 56 is achieved, and securing member 96 produces a hooking effect and tilt prevention for rolling bearings 48 and 50.

As FIG. 10 shows, a magnetically effective air gap 99 is located between internal rotor 20 and magnet 37 of rotor 28.

Internal stator 20 is completely encased with a plastic 62 in an injection-molding operation. The following, inter alia, are suitable as plastics:

polyamides, e.g. ULTRAMID®[1] A3X2G5 or polyamide 66

[1] ULTRAMID is US TM Reg. # 762,530, issued 1964 to BASF AG of Ludwigshafen, Germany and Florham Park N.J. 07932.

PBT (PolyButylene Terephthalate), e.g. TECHNYL[2] (PBT-G20FR). These plastics can be reinforced with fibers, e.g. with approximately 20% to approximately 25% glass fillers. These substances can be welded, for example by ultrasonic welding or laser welding. Adhesive connections, seals, or sealing elements are alternatively possible, for example in the form of two-component plastic parts.

[2] TECHNYL is US TM Reg. # 2,806,114, issued 2004 to Rhodia Engineering Plastics S.A. of Saint Fons, France & Cranbury N.J.

Figure 3:
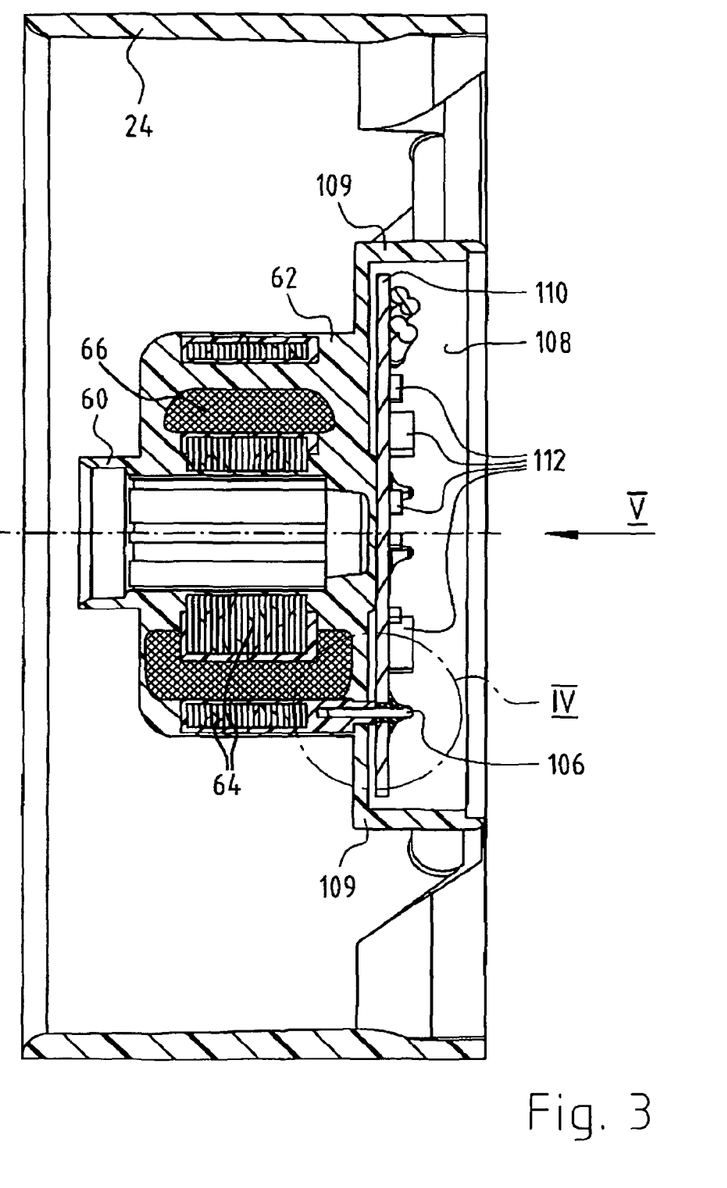
FIG. 3 is a depiction analogous to FIG. 1, but in which a circuit board on which electrical components of the motor are located is installed.

As shown, for example, by FIGS. 1 and 3, stator lamination stack 64 has a slot insulator 104 which forms a coil former into which is wound stator winding arrangement 66, whose shape and construction depend on the use of the motor, and which is therefore shown only schematically.

Figure 4:
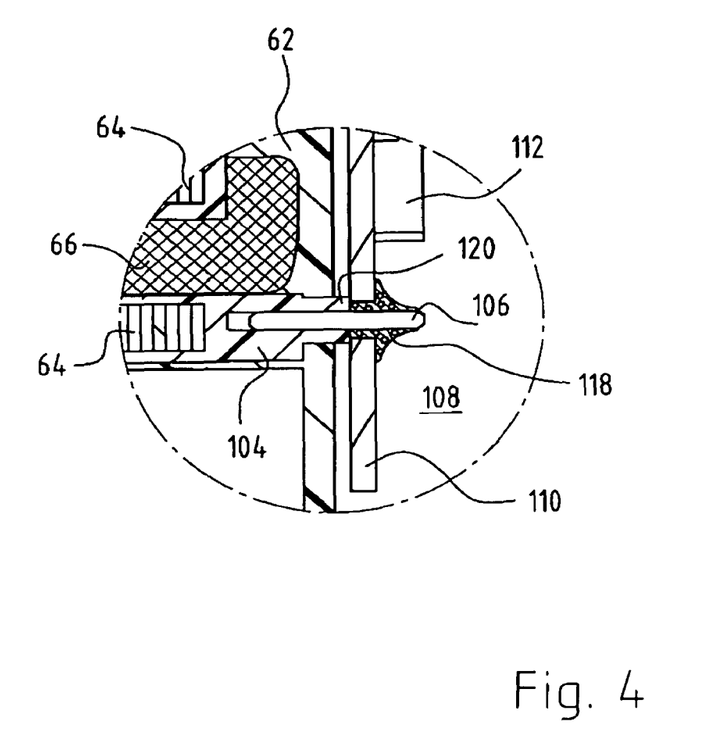
FIG. 4 is an enlarged depiction of detail IV of FIG. 3.

As FIG. 4 shows, contact pins 106, which project to the right in FIG. 4, are secured in this slot insulator 104. (FIG. 4 shows only one of these contact pins.) One end of a wire 154 (FIG. 14) of stator winding arrangement 66 can be electrically and mechanically secured to these contact pins 106. In this exemplifying embodiment, a total of four such pins 106 are provided on internal stator 20.

Figure 5:
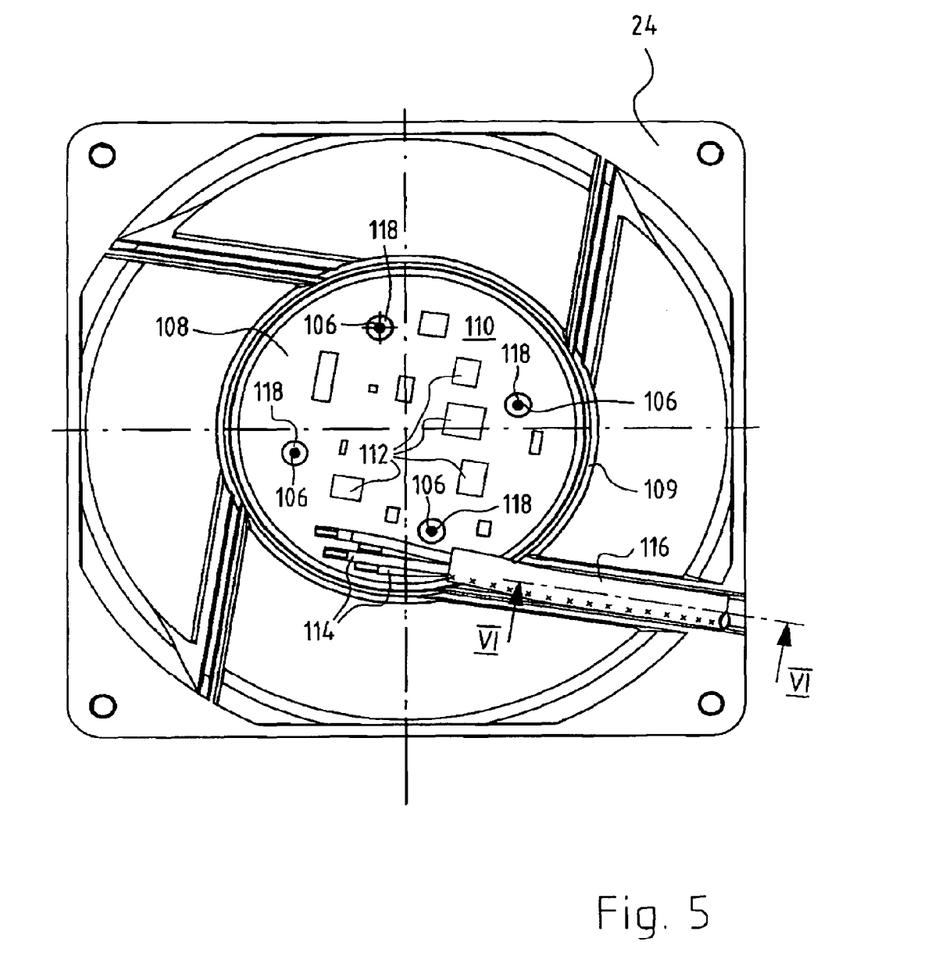
FIG. 5 is a plan view looking in the direction of arrow V of FIG. 3.
Figure 6:
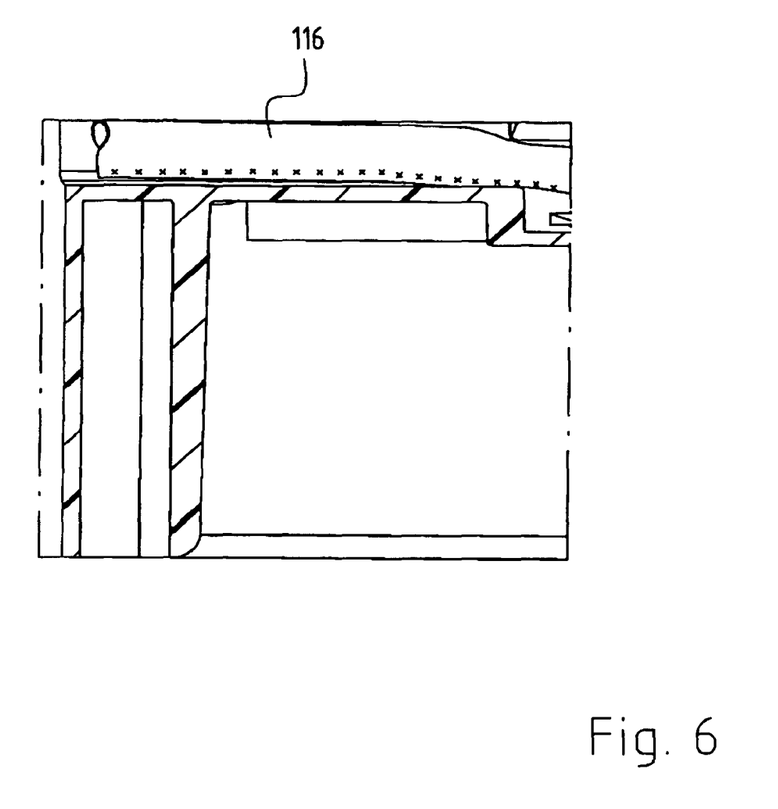
FIG. 6 is a section looking in the direction of line VI-VI of FIG. 5.

In FIG. 1 and following, pins 106 project into a cavity 108 whose side wall is labeled 109 and in which is located (as shown in FIG. 3) a circuit board 110, on which electrical components 112 for motor 20 are arranged. As FIG. 5 shows, strands 114 of a connector cable 116 are attached to circuit board 110. Pins 106 are also soldered onto conductor paths of circuit board 110 by solder connections 118 (see FIG. 4). Circuit board 110 is held by spacing members 120 (FIG. 4) at a distance from plastic casing 62, which latter also forms the bottom and side wall 109 of cavity 108.

Figure 7:
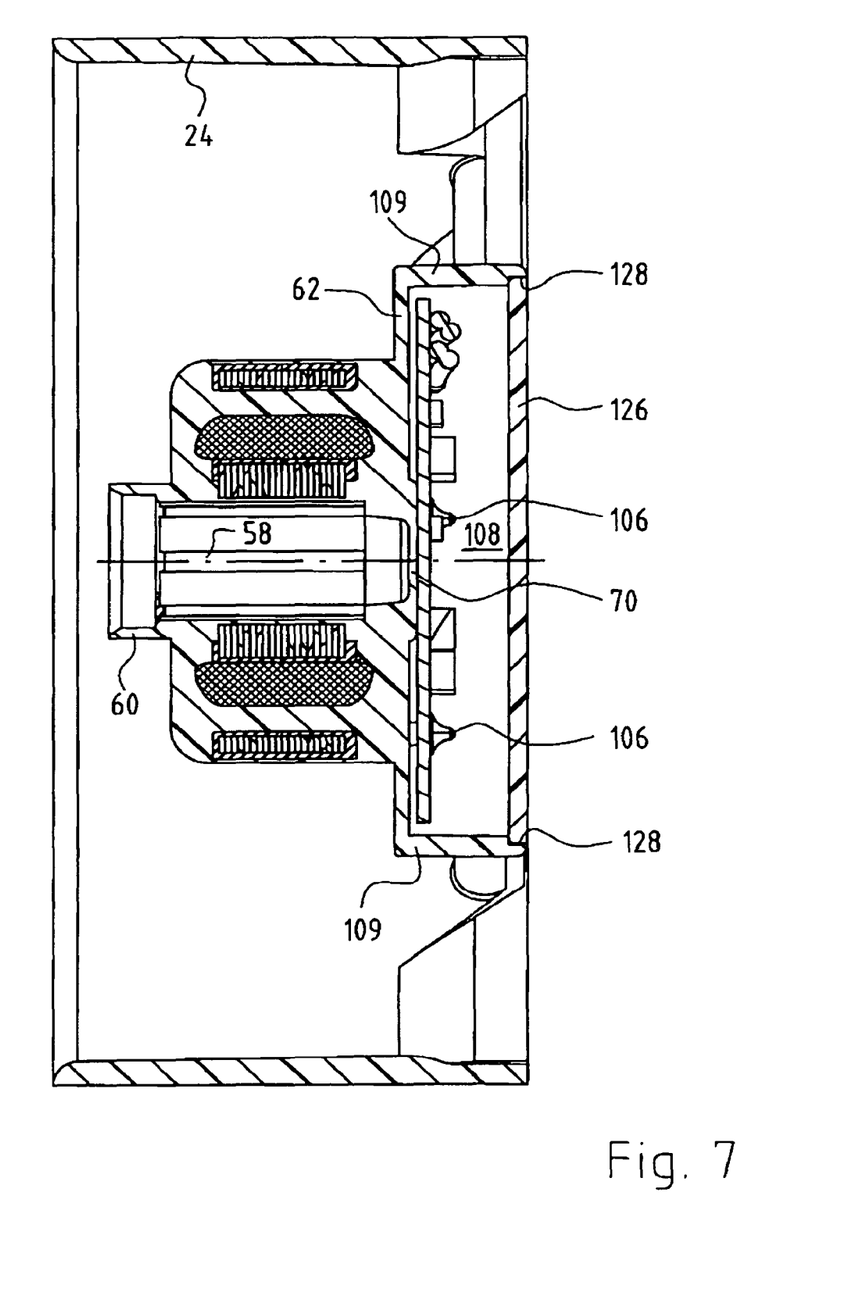
FIG. 7 is a view analogous to FIG. 3 but in the closed state.

After being fitted with circuit board 110 and after strands 114 are attached (FIG. 5), cavity 108 is closed off with a cover 126 (FIG. 7). The latter can be, for example, welded with ultrasound to side wall 109 at weld joins 128, or with an adhesive bond.

It is particularly advantageous here that circuit board 110 having electrical components 112 is arranged in a cavity 108, so that components 112 are not over-molded with plastic; this might cause components 112 to be torn away from circuit board 110 by the change in volume as the encapsulating material hardens. This risk does not exist here. It is also not precluded in some cases, however, to over-mold components 112 with plastic or provide them with a protective coating.

Figure 8:
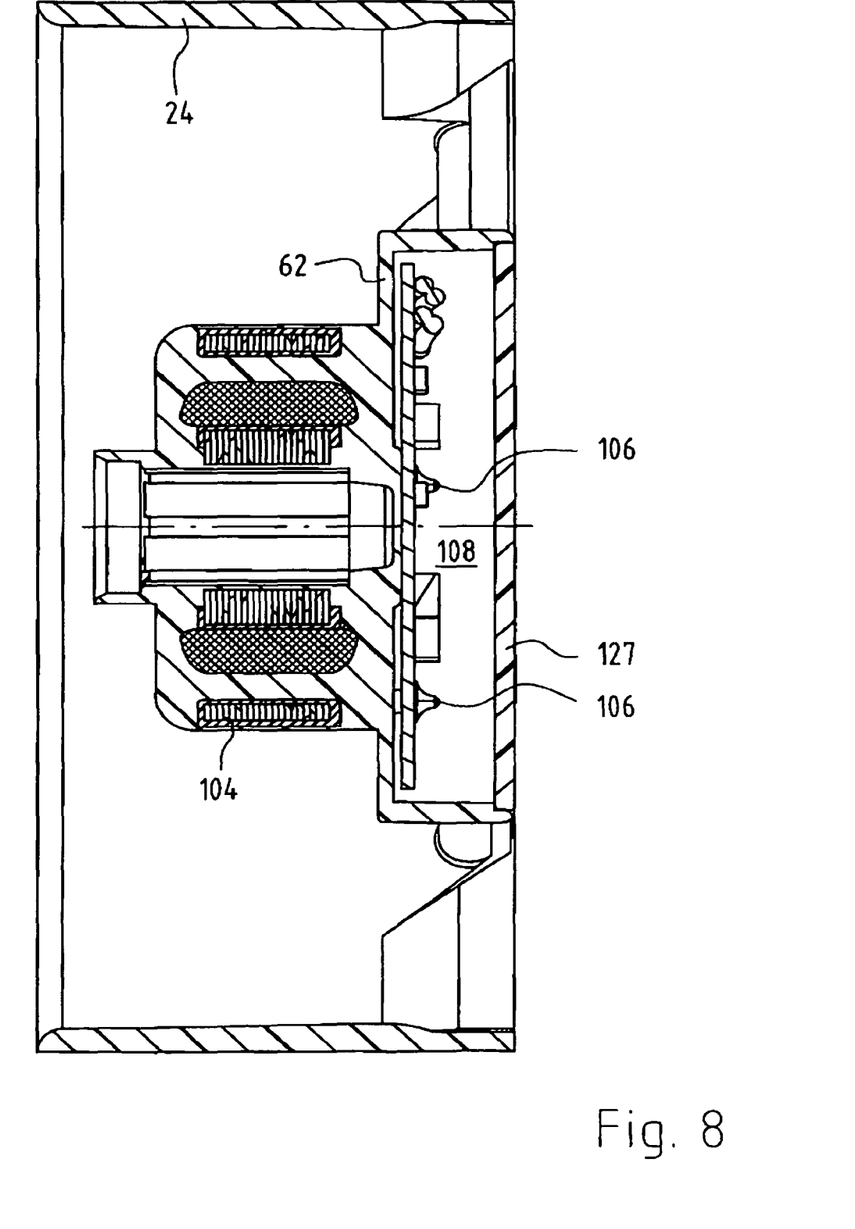
FIG. 8 is a variant of FIG. 7.

Instead of a cover 126, a closure cap 127 can also be used, as depicted by way of example in FIG. 8. Closure cap 127 can be secured, for example, by welding or adhesive bonding.

Figure 2:
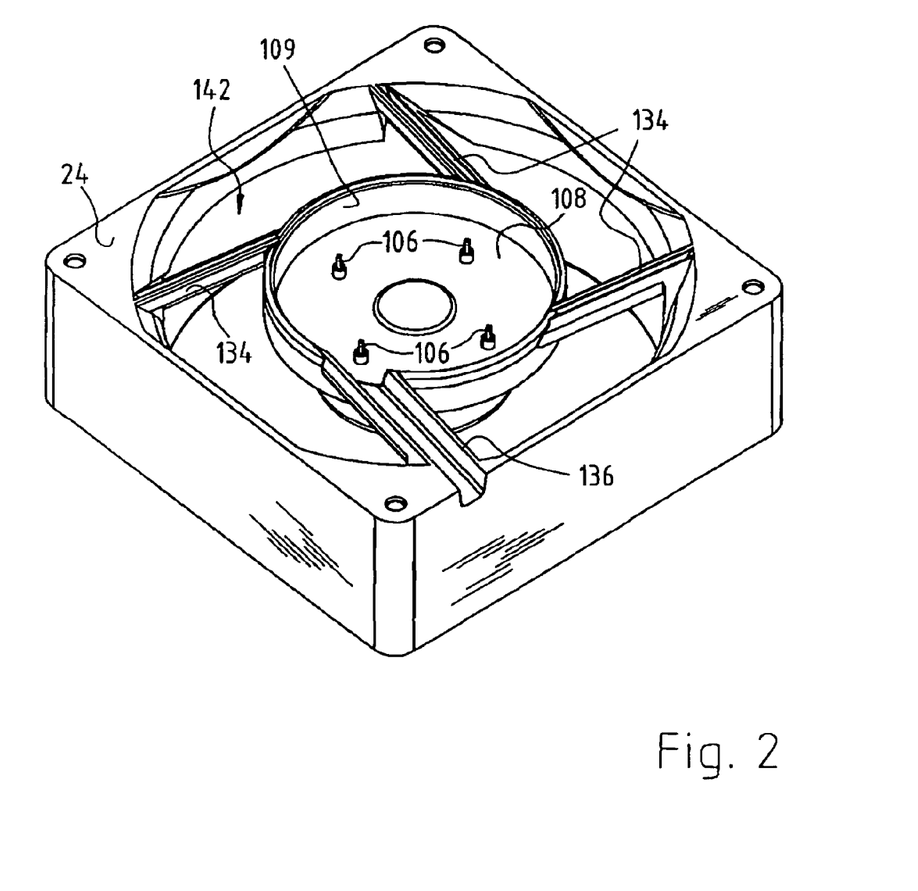
FIG. 2 is a perspective view of the basic structure of FIG. 1, viewed approximately in the direction of arrow II of FIG. 1.

As FIG. 2 shows, wall 109 of cavity 108 is connected via three simple spokes 134 and one channel-shaped spoke 136 to fan housing 24, which forms an air pass-through aperture 142 similar to a Venturi conduit. Spoke 136 serves for guidance of cable 116 (see FIG. 5). Cable 116 is sealed by means of a rubber seal (not visible).

Fan housing 24 is thus implemented integrally with a part of the wall of cavity 108 by means of spokes 134, 136, and integrally with the casing of internal stator 20, so that all these parts can be manufactured in a single working step; this simplifies and speeds up production and moreover reduces costs. Since the assembly of rotor 28 is also greatly simplified, the result is an inexpensive product with outstanding properties and a long service life.

FIG. 9 depicts, at 37, the permanent magnet of rotor 28 which is secured in magnetic yoke 38. Its magnetization can be implemented with two poles, four poles, six poles, etc.

FIG. 10 shows how blades 32 project into Venturi conduit 142.

Figure 13:
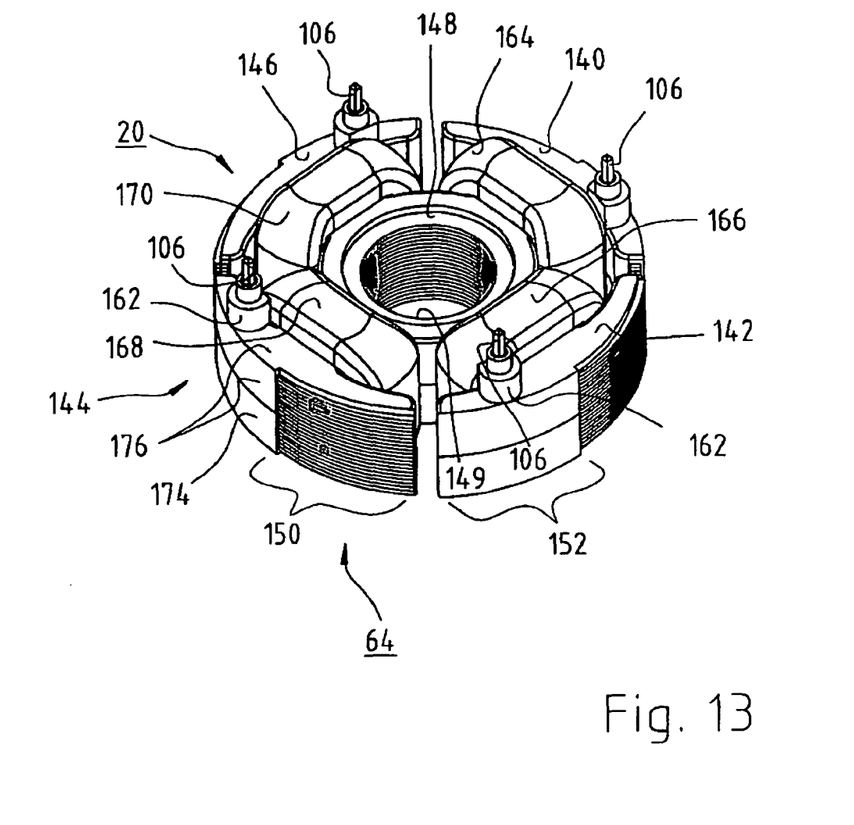
FIG. 13 shows identical salient poles 140, 142, 144, 146 and a magnetic yoke 148 inside which bearing tube 56 (FIG. 1) is located when the fan is complete.

FIG. 13 is a perspective depiction of a completely wound internal stator 20 that serves, so to speak, as a precursor product in the manufacture of a motor or fan. Its stator lamination stack 64 has, in this example, four identical salient poles 140, 142, 144, 146 and a magnetic yoke 148 having a central opening 149 in which, when the fan is complete, is located bearing tube 56 (FIG. 1) with its longitudinal ribs 158.

Figure 14:
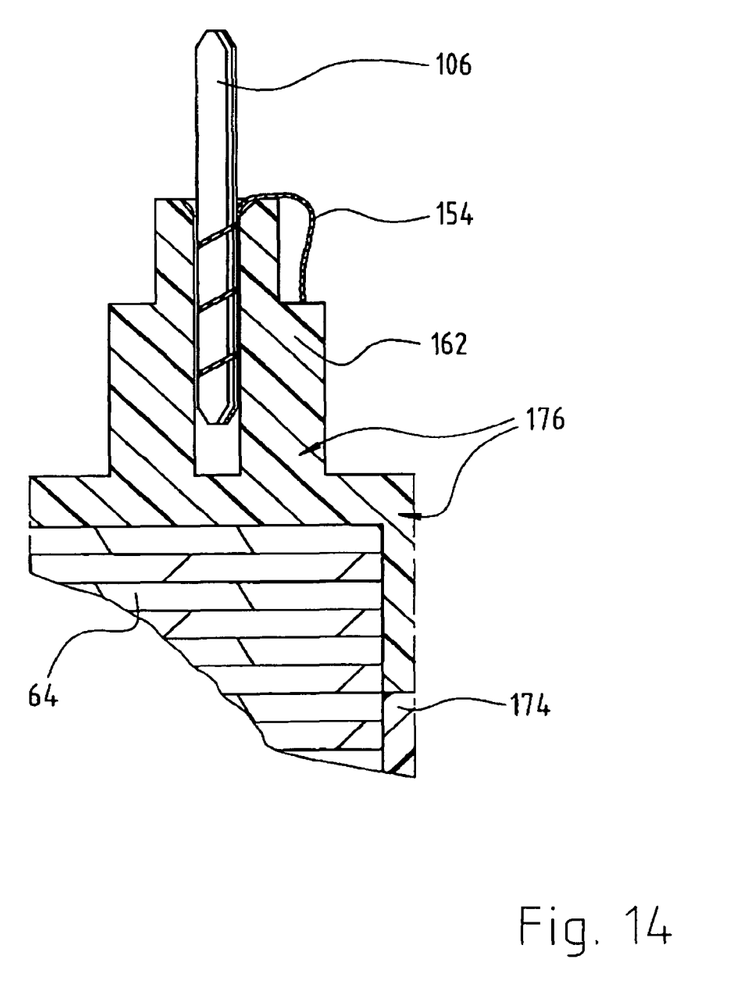
FIG. 14 is a sectioned depiction of a contact pin that serves for connecting the internal stator to the circuit board.

In this exemplifying embodiment, poles 140 to 146 have different outside diameters on their side facing toward air gap 99 (FIG. 10). In this state, a larger-diameter portion 150 is not yet covered with plastic. A smaller-diameter portion 152 is covered here with insulation made up of two mounted-on half-shells 174, 176. There are various possibilities, known from the existing art, for this covering of the internal stator: for example, as depicted, the use of the two half-shells 174, 176, or over-molding with insulating material, or the use of a special insulating paper. Contact pins 106, which are depicted e.g. in FIGS. 1 to 5, are also attached on upper half-shell 176. FIG. 14 shows how a winding wire 154 is secured to pin 106. For this, the latter is secured in a projection 162 of half-shell 176, and that projection also serves as a spacing member for circuit board 110 (see FIG. 3 or 4).

Located on stator poles 140 to 146 in this example are concentrated windings 164, 166, 168, 170 whose terminals are connected in the usual manner to contact pins 106. The use of a distributed winding and a corresponding lamination stack would of course also be possible.

As FIG. 1 shows, the wound internal stator 20 is over-molded on all sides with a plastic 62, i.e. including at portions 150 of stator lamination stack 64, only a thin insulation layer (for example, 0.4 mm thick) being produced there.

As FIG. 1 shows, upon over-molding the cavities of internal stator 20 are filled up, bearing tube 56, 58 with its collar 60 is produced, also wall 109 of cavity 108 and spokes 134, 136, and lastly also fan housing 24, so that a fan is obtained, so to speak, in a "single shot."

After further assembly (circuit board 110, connector cable 116 (FIG. 5)), etc., external rotor 20 is installed as depicted in FIG. 9 and also described there, and lastly an identification plate is attached, etc.

The number of stator and rotor poles, the shape thereof, etc. are of course a function of the desired properties of the motor, as is known to one skilled in the art of electrical engineering. In some cases, for example, stator lamination stack 64 on the air-gap side can be covered with plastic not at all or only over a smaller area, or a very thin plastic layer is used.

Many further variants and modifications are possible, within the scope of the present invention.

What is claimed is:

1. An electronically commutated external-rotor motor comprising
    an internal stator (20) having a stator lamination stack (64), a winding arrangement (66) associated with the latter, and a central opening (149) defined by the stator lamination stack (64), in which central opening a bearing tube (56) is arranged;
    a permanent-magnet external rotor (26), separated from the stator lamination stack (64) by a magnetically effective air gap (99), which rotor has a shaft (42) which is journalled in the bearing tube (56) and to whose region facing toward the external rotor (26) a hub (40) is fixedly connected, which hub is equipped, on its side facing toward the internal stator, with an axial projection (80);
    two rolling bearings (48, 50) arranged at a distance from one another in the bearing tube (56), namely a first rolling bearing (48) on an end of the shaft (42) adjacent the hub (40),
    and a second rolling bearing (50) adjacent another end of the shaft (42) remote from the hub (40), which rolling bearings (48, 50) each comprise an outer ring and an inner ring,
    wherein the inner ring of the first rolling bearing (48) abuts against the axial projection (80) of the hub (40), and the outer ring of the second rolling bearing (50) abuts against a shoulder (82) formed on an inner surface of the bearing tube (58),
    and the shaft (42) having a free end (74),
    the inner ring of the second rolling bearing (50) being arranged displaceably on the shaft (42), and means (78) for applying a spring force, effective between the inner ring of the second rolling bearing (50) and the free end (74) of the shaft (42), which force is adapted to urge said inner ring toward the hub (40),
    and the outer ring of the first rolling bearing (48) being braced by a holding member (96) against a collar (60) provided on the bearing tube (56).

2. The motor according to claim 1, wherein the bearing tube (56) is closed off, on its side facing away end remote from the hub (40), by a fluid-tight closure (70).

3. The motor according to claim 1, the rotor (28) of which is equipped with at least one opening (44) that enables the introduction of a tool (92) by means of which the holding member (96) can be displaced into abutment against the outer ring of an adjacent one (48) of said rolling bearings.

4. The motor according to claim 1, wherein
    the holding member (96) comprises an edge (98) that points toward the hub (40) and is in engagement with the collar (60) of the bearing tube (56).

5. The motor according to claim 2, the rotor (28) of which is equipped with at least one opening (44) that enables the introduction of a tool (92) by means of which the holding member (96) can be displaced into abutment against the outer ring of an adjacent one (48) of said rolling bearings.

6. The motor according to claim 2, wherein
    the holding member (96) comprises an edge (98) that points toward the hub (40) and is in engagement with the collar (60) of the bearing tube (56).

* * * * *